United States Patent [19]

Shinozaki et al.

[11] Patent Number: 4,864,346

[45] Date of Patent: Sep. 5, 1989

[54] PROGRAM SHUTTER

[75] Inventors: Nobuo Shinozaki; Shigeru Tagami; Masaki Tanaka; Katauhito Niwa, all of Yotsukaido, Japan

[73] Assignee: Seikosha Co., Ltd., Tokyo, Japan

[21] Appl. No.: 132,463

[22] Filed: Dec. 14, 1987

[30] Foreign Application Priority Data

Dec. 15, 1986 [JP] Japan ............................ 61-297909

[51] Int. Cl.$^4$ ............................................. G03B 7/08
[52] U.S. Cl. ................................... 354/439; 354/452
[58] Field of Search ............... 354/441, 442, 443, 436, 354/437, 439, 451, 452

[56] References Cited

U.S. PATENT DOCUMENTS 4,648,701 3/1987 Ogihara et al. .................... 354/439
4,693,583 9/1987 Ogihara et al. .................... 354/439
4,696,560 9/1987 Ogihara et al. .................... 354/439
4,697,908 10/1987 Ogihara et al. ................... 354/439
4,720,726 1/1988 Sato et al. ......................... 354/439

Primary Examiner—Russell E. Adams
Attorney, Agent, or Firm—Bruce L. Adams; Van C. Wilks

[57] ABSTRACT

There is disclosed a program shutter for use in a camera. The program shutter consists of a shutter mechanism and a control portion. The shutter mechanism has sectors for defining an opening and a stepper motor for driving the sectors. The control portion produces pulses having pulse width conforming to the operating characteristic of the shutter mechanism. These pulses are used to step the motor forward or backward according to the exposure corresponding to the luminance of the subject.

6 Claims, 4 Drawing Sheets

PROGRAM SHUTTER

FIELD OF THE INVENTION

The present invention relates to a program shutter and, more particularly, to a program shutter whose blades are driven by a stepper motor.

BACKGROUND OF THE INVENTION

A program shutter whose blades are driven by a stepper motor operates in the manner described below. When a shutter-release button is depressed, pulses of a certain frequency are applied to the stepper motor to rotate it in the forward direction for gradually opening the sectors. When the motor rotates through an angle corresponding to the light exposure value, the phase of the pulses is switched to another phase. Then, the motor is rotated in the backward direction to close the sectors thereby obtaining an appropriate exposure The shutter constructed as described above has some drawbacks. In particular, when the shutter is at rest, the members that open and close the sectors are held at their home positions by springs to prevent the occurrence of a malfunction. Therefore, when the sectors are being opened, the motor is loaded by the springs. Also, during the opening process of the sectors, the diameter of the opening does not change uniformly with time because of either the inertia the of the movable components or the fit tolerances of various components. This has made it impossible to accurately control the exposure.

SUMMARY OF THE INVENTION

In view of the foregoing problems, it is a main object of the present invention to provide a program shutter whose sectors define an opening the diameter of which can be varied uniformly with time while the shutter is being opened.

The above object is achieved in accordance with the teachings of the invention by a program shutter including a shutter mechanism comprising sectors forming a lens aperture and a stepper motor that can rotate forward or backward to open or close the sectors. The pulse Width of each pulse applied to the motor to drive it is determined according to the operating characteristic of the shutter mechanism in order that the diameter of the opening changes uniformly with time.

DETAILED DESCRIPTION OF THE INVENTION

Figure 1A:
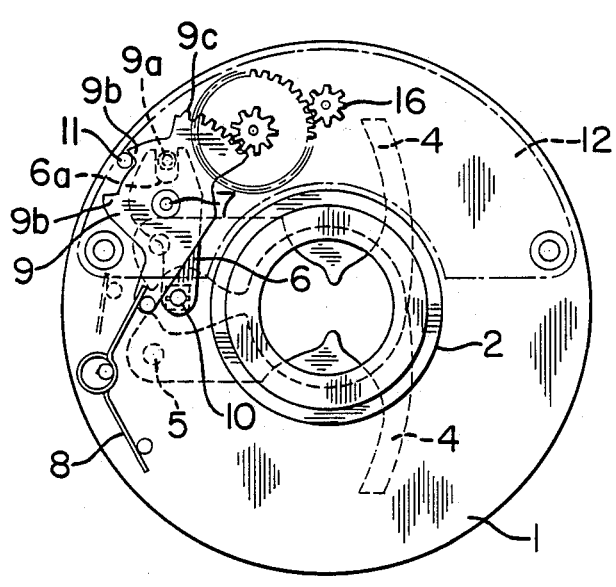
FIG. 1(a) is a front elevation of a shutter mechanism for use in a program shutter according to the invention.
Figure 1B:
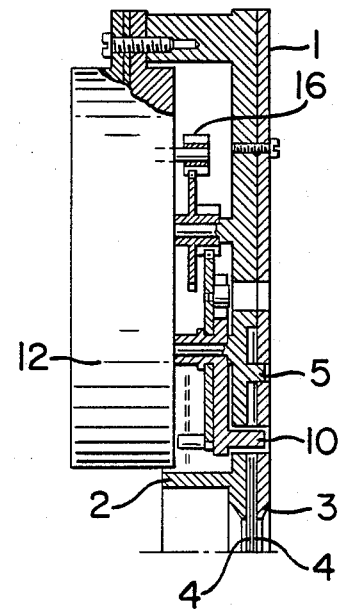
FIG. 1(b) is a cross-sectional view of the mechanism shown in FIG. 1(a)

Referring to FIGS. 1(a) and 1(b), there is shown a shutter mechanism embodying the concept of the present invention. The mechanism has a mount 1 on which a base plate 2 is mounted, the plate 2 acting to place a lens in position. A sector chamber 3 is formed between the mount 1 and the base plate 2. Two sectors 4 for defining the aperture of the lens are held to pins 5, respectively, so as to be rotatable symmetrically within the chamber 3. A lever 6 for driving the sectors is rotatably mounted by means of a shaft 7 that extends upright from the mount 1. The lever 6 is provided with a groove 6a at its one end. A wheel 9 (described later) for driving the sectors 4 is held rotatably to the shaft 7 and has a pin 9a with which the lever 6 engages within the groove 6a. A sector pin 10 mounted to the mount 1 brings the lever 6 into engagement with the sectors 4. The wheel 9 is rotatably held to the shaft 7, and has a pair of angle-setting portions 9b on its outer periphery. When the wheel 9 is at rest, a spring 8 biases the same to the left into its home position. A portion of the periphery of the wheel 9 has teeth 9c which are connected via a gear train with a shaft 13a for driving a stepper motor 12 (described later). A pin 11 engages with either one of the angle-setting portions 9b of the wheel 9 to limit the range within which the wheel can rotate.

Figure 2A:
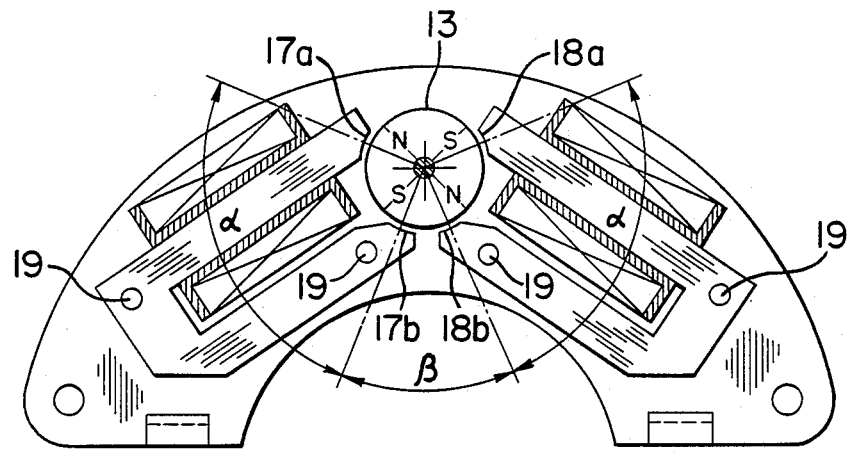
FIG. 2(a) is a front elevation of a stepper motor for use in the shutter mechanism shown in FIGS. 1(a) and 1(b)
Figure 2B:
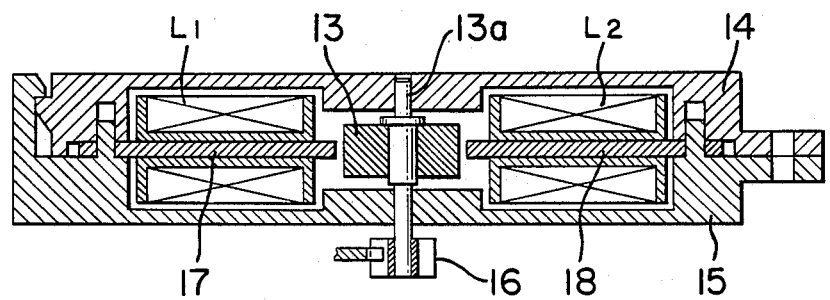
FIG. 2(b) is a cross-sectional view of the motor shown in FIG. 2(a)

One example of the aforementioned stepper motor is shown in FIGS. 2(a) and 2(b). The motor includes a rotor 13 having four poles, the rotor being made of a permanent magnet. One end of the shaft 13a of the rotor and the other end thereof extends beyond and is rotatably attached to an upper plate 14 a lower plate 15. A pinion 16 is mounted to the protruding end of the shaft 13a and drives the sector-driving wheel 9 of the shutter mechanism. U-shaped stators 17 and 18 each have two legs, and are made of a magnetic material. Exciting coils $L_1$ and $L_2$ are wound around one leg of the sector 17 and one leg of the sector 18, respectively. The stators 17 and 18 have poles 17a, 17b and 18a, 18b, respectively, at their front ends. The poles 17a and 17b are angularly displaced by 90° from the poles 18a and 18b about the rotor 13. The stators 17 and 18 are held in position by guide pins 19 in such a way that an angle is formed between them as shown and that the poles 17b and 18b assume positions of 45° with respect to the rotor 13. The rotor 13 can be rotated either forward or backward in steps of 90°.

Figure 3:
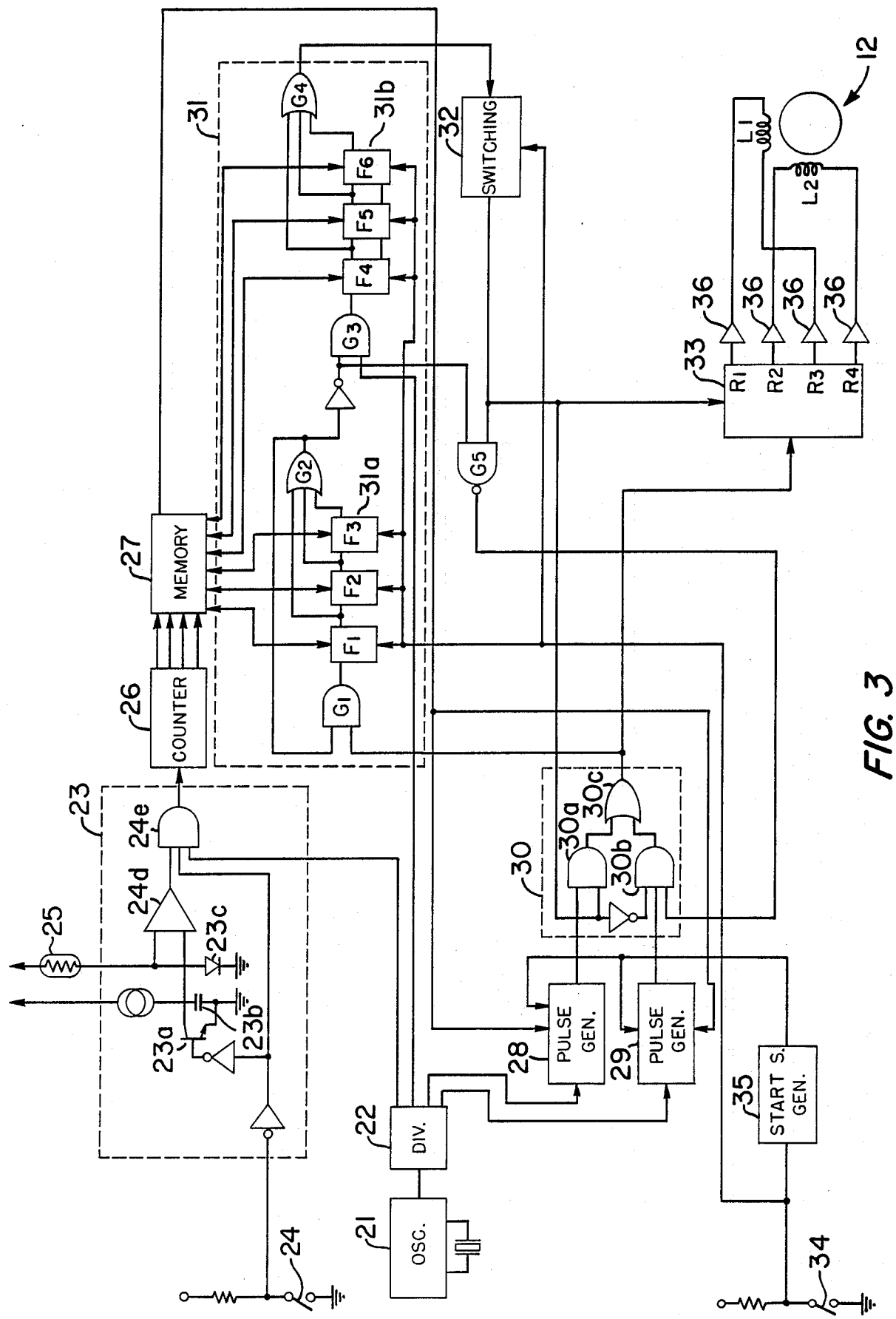
FIG. 3 is a block diagram of an apparatus for controlling the shutter mechanism shown in FIGS. 1(a) and 1(b)

Referring next to FIG. 3, there is shown an apparatus that controls the operation of the shutter mechanism described above. This apparatus has a clock pulse generator 21 equipped with a crystal oscillator. A frequency divider circuit 22 receives the clock pulses from the pulse generator 21 and produces clock pulses $CK_1$, $CK_2$, $CK_3$, $CK_4$ of frequencies which are integral submultiples of the input frequency. The clock pulses $CK_1$ are used to convert data obtained by photometry into digital form. The clock pulses $CK_2$ and $CK_3$ are employed to step the motor. The clock pulses $CK_4$ are used for interpolating purposes. A luminance detector circuit 23 comprises a transistor 23a, a capacitor 23b, a diode 23c, a comparator 24d, and a gate 24e. The transistor 23a is turned on or off by a switch 24 that interlocks with the shutter-release button (not shown). The capacitor 23b is charged with a constant current from the transistor 23a. The comparator 24d compares the voltage developed across the capacitor 23b with the voltage produced across the diode 23c that is connected in series with a luminance detector 25 made from CdS or the like. The diode 23c is used for logarithmic compression. When the switch 24 is closed, the gate 24e is enabled to permit the clock pulses $CK_1$ to be supplied to a counter circuit 26 (described later). When the output signal from the comparator 24d is inverted, the gate 24e is inhibited so that the clock pulses $CK_1$ may no longer be fed to the counter circuit 26. Thus, the luminance detector 23 is designed to digitize data regarding the luminance of the subject.

When the switch 24 is closed, the aforementioned counter circuit 26 is cleared and, at the same time, begins to count the output signal from the luminance detector circuit 23. The total count of the counter circuit 26 is fed to a memory 27 in which data corresponding to various values of luminance of the subject is stored to drive the stepper motor 12. Data on the number of steps in which the stepper motor is to be rotated and interpolation data used to correct the error of the exposure caused by this step number can be accessed, depending on the total count of the counter circuit 26. The memory 27 also stores data used to determine the pulse width of each clock pulse applied to the stepper motor. This kind of data is read out immediately before the stepper motor makes the next step movement, according to either the output from a counter 31a or the output from a counter 31b.

A pulse generator circuit 28 produces pulses $P_1, \ldots, P_n$ according to the clock pulses $CK_2$ to rotate the stepper motor in the forward direction against the action of the spring 8 (FIG. 1) of the shutter mechanism. When a pulse switching circuit 32 (described later) is switched to its reverse condition, the pulse generator circuit 28 stops producing pulses and another pulse generator circuit 29 begins to deliver pulses $Q_1, \ldots, Q_n$ according to the clock pulses $CK_3$ to rotate the motor in the backward direction. A pulse-switching circuit 30 comprises AND gates 30a, 30b, and an OR gate 30c that is connected with the AND gates 30a and 30b. The AND gates 30a and 30b receive pulses $P_m$ and $Q_n$ from the pulse generator circuits 28 and 29, respectively, at their respective one ends. The output signal from the switching circuit 32 is applied directly to the other end of the AND gate 30a and via an inverter to the other end of the AND gate 30b. When the motor turns in the forward direction, the pulse-switching circuit 30 delivers pulses $P_a$. When the motor rotates in the reverse direction, the circuit delivers pulses $Q_n$.

A rotational direction-switching counter circuit 31 consists of a first presettable down counter 31a and a second presettable down counter 31b. The counter 31a comprises flip-flops $F_1$-$F_3$ connected together in cascade. The second down counter 31b comprises flip-flops $F_4$-$F_6$ connected together in cascade. When the motor is started in the forward or backward direction, the number of steps incremental rotation is loaded into the first counter 31a from the memory 27. Then, this counter is decremented whenever one pulse P or Q is applied to it, until the total count reaches zero. Then, an output signal is produced from an output gate $G_2$. When the motor commences rotating forwardly, data concerning the amount of interpolation is loaded into the second counter 31b from the memory 27. After the total count of the counter 31a arrives at zero, the counter 31b is decremented with each interpolating clock $CK_4$ until the total count reaches zero, after which an output signal is delivered from an output gate $G_4$. The data used to determine the pulse width of the pulses $P_1$-$P_n$ and $Q_1$-$Q_n$ is supplied to the pulse generator circuit 28 or 29 from the memory 27 in response to the output signal from the counter 31a or 31b immediately before the generation of each pulse.

A pulse-switching circuit 32 latches the output signal from the rotational direction-switching counter circuit 31 and operates the pulse-switching circuit 30 so that the output from it may be switched from the pulses P to the pulses Q. At the same time, the switching circuit 32 changes the direction in which pulses are moved in a motor driver circuit 33 consisting of a ring counter. Whenever one pulse is applied to the ring counter, the terminal at which an output signal appears shifts to the neighboring terminal. The pulses from the switching circuit 30 are applied to the driver circuit 33, which switches the direction of movement of pulses according to the output signal from the switching circuit 32 to rotate the stepper motor forward or backward.

When the release button is depressed, a second switch 34 is closed to reset the rotational direction-switching circuit 31 and the pulse-switching circuit 32. Also, when the switch 34 is closed, a start signal generator circuit 35 produces an output signal for setting the pulse generator circuits 28 and 29 into operation. Signals appearing at the output terminals $R_1$-$R_4$ of the motor driver circuit 33 are amplified by driver circuits 36, respectively, before application to the exciting coils $L_1$ and $L_2$ of the stepper motor.

The operation of the apparatus constructed as described above is next described by referring to the timing diagram of FIG. 4. First, the power switch (not shown) is turned on. Then, the release button on the body of the camera is depressed to a first position to close the first switch 24. This operates the luminance detector circuit 23 to produce clock pulses $CK_1$ the number of which corresponds to the luminance of the subject. Thus, data about the luminance is loaded into the counter 26. The number of steps determined so as to accommodate the exposure according to the luminance data from the counter 26 and the amount of interpolation for correcting such a step movement are placed into the first down counter 31a and the second down counter 31b, respectively, of the rotational direction-switching circuit 31 from the memory 27. In this way, the data regarding the exposure corresponding to the luminance of the subject is loaded into the down counters.

Subsequently, the release button is depressed to a second position to close the switch 34, resetting the rotational direction-switching circuit 31 and the pulse switching circuit 32. Concurrently, the pulse generator circuits 28 and 29 are operated to produce pulses P and Q. The pulse-switching circuit 30 selects the pulses P as the signal supplied to the first counter 31a of the switching counter 31 and also to the motor driver circuit 33. The stepper motor 12 rotates one step in the forward direction against the action of the spring 8 (FIG. 1) in response to each pulse P applied to it, in order to open the sectors 4 as indicated by the solid line in FIG. 4(a). At this time, data about the pulse width for compensating for the inertia of the shutter mechanism and for correcting for the play attributed to fit tolerances is transmitted from the memory 27 to the pulse generator circuit 28. During this process, the first down counter 31a is decremented with each input pulse.

Figures 4A, 4B:
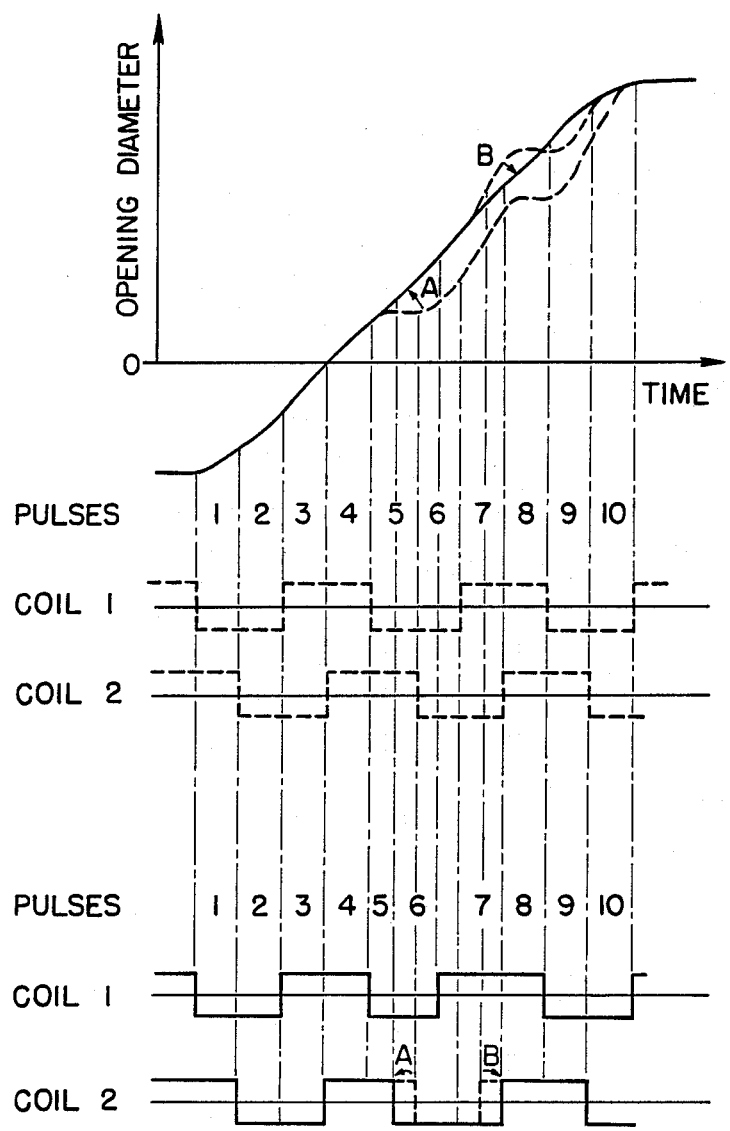
FIG. 4 is an explanatory diagram for illustrating the operation of the apparatus shown in FIG. 3.

In the conventional apparatus, the stepper motor is driven with pulses P of a constant frequency as indicated by the broken line in FIG. 4(b). Therefore, hunting is caused by the operating characteristic of the shutter mechanism as indicated by the broken lines in FIG.

4(a). As a result, the diameter of the opening does not vary uniformly with time. In the present invention, the pulse width of each pulse P is set as indicated by the solid lines in FIG. 4(b), according to the operating characteristic. Data about the pulses is stored in the memory 27. The sectors 4 are driven in the manner indicated by the solid line in FIG. 4(a).

More specifically, in the invention, the pulse $P_5$ is delivered earlier so that the diameter of the opening may change uniformly with time as indicated by the solid line; otherwise the diameter would vary nonuniformly as indicated by the broken line in FIG. 4(a). The earlier generation of the pulse $P_5$ moves the sectors 4 quickly in the direction indicated by the arrow A. Conversely, the pulse $P_7$ is produced later to drive the sectors 4 slowly in the direction indicated by the arrow B, for achieving the uniform rate of change of the opening diameter; otherwise the diameter would change in a nonuniform manner as indicated by the broken line in FIG. 4(a).

When the predetermined n-th pulse $P_n$ is applied to the first down counter 31a, interpolating clock pulses $CK_4$ are supplied to the second counter 31b from the gate $G_3$ while the stepper motor is on its way to the final angular position. When the number of the applied clock pulses $CK_4$ reaches the number loaded in the second counter 31b, the switching circuit 32 is switched to the other state. Under this condition, the switching circuit 32 causes the pulse-switching circuit 30 to deliver the pulses $Q_n$. At the same time, the direction of movement of pulses in the motor driver circuit 33 is switched to the other direction for reverse rotation. Then, the pulse $Q_2$ from the switching circuit 30 is applied to the driver circuit 33 to reverse the motor. The motor rotates the sectors in a stepwise fashion in the reverse direction in synchronism with the pulses Q with the aid of the resilient force stored on the spring 8. As a result, the sectors 4 are closed. The pulse width of each pulse Q is set according to the operating characteristic in response to the output signal from the counter 31b in the same manner as in the case of forward rotation. When the total count of the first counter 31a again becomes zero, the sectors 4 are returned to their original positions, thus blocking the optical path.

Thereafter, the output signal from the switching circuit 32 and the inverted output signal from an OR gate $G_2$ are supplied to a NAND gate $G_5$ to enable the AND gate 30b. This prevents the OR gate 30c from delivering the pulses for stepping the motor in the backward direction, In this state, the motor 12 does not operate. The release button is returned to its original position. Then, the switch 24 is opened. Thus, preparations for the next photographing are made.

In the above example, the pulse width of some pulses are altered in such a way that the pulse $P_5$ is produced earlier to move the sectors in the direction indicated by the arrow A and that the pulse $P_7$ is produced later to shift the sectors in the direction indicated by the arrow B. The particular direction of correction, the pulses to be modified, and other factors which are stored in the memory 27 should be experimentally determined, taking the operating characteristic into account. If the apparatus operates stably, it is not necessary to make any compensation for the pulse Q.

As described thus far, in the present invention, the pulse width of some pulses are compensated according to the operating characteristic of the shutter mechanism, so that the diameter of the opening of the sectors changes uniformly with time. Thus, the sectors operate smoothly. This permits accurate control over the exposure corresponding to the luminance of the subject. Further, when a photograph is taken by flash photography, the shutter is released in synchronism with the flash at an appropriate opening diameter corresponding to the distance, and accurate control is allowed. Furthermore, the reliability with which exposure operation is performed can be enhanced, because the sectors move smoothly.

What is claimed is:

1. A programmable shutter for a camera comprising: shutter sector means mounted to undergo displacement in opening and closing directions to form a variable lens aperture; first means including a bidirectional stepping motor rotationally driveable in a stepwise manner in forward and reverse directions in response to forward and reverse driving pules for effecting displacement of the shutter sector means in the opening and closing directions to effects progressive opening and closing of the variable lens aperture; and second means for producing forward and reverse driving pulses and applying the same to the first means to control the stepwise rotation of the stepping motor in the forward and reverse directions, the second means including means for producing forward and reverse driving pulses of predetermined pulse widths, at least some of the pulse widths being different than the others and all of the pulse widths being selected to obtain a desired opening characteristic of the variable lens aperture.

2. A programmable shutter for a camera according to claim 1; wherein at least some of the forward driving pulses have different pulse widths.

3. A programmable shutter for a camera according to claim 2; wherein the reverse driving pulses all have the same pulse width.

4. A programmable shutter for a camera according to claim 1; wherein the means for producing forward and reverse driving pulses of predetermined widths includes means for producing forward driving pulses at least some of which have different pulse widths than the others and all of which coact to effect opening of the variable lens aperture so that the progressively opening diameter thereof changes at a uniform rate.

5. A programmable shutter for a camera according to claim 4; wherein the second means includes brightness measuring means for measuring the brightness of an object to be photographed during use of the programmable shutter and producing an output signal corresponding to the measured object brightness, and means for determining the number of forward and reverse driving pulses to be applied to the first means in accordance with the output signal.

6. A programmable shutter for a camera according to claim 1; wherein the second means includes brightness measuring means for measuring the brightness of an object to be photographed during use of the programmable shutter and producing an output signal corresponding to the measured object brightness, and means for determining the number of forward and reverse driving pulses to be applied to the first means in accordance with the output signal.

* * * * *